(12) United States Patent
Yang et al.

(10) Patent No.: US 9,202,267 B1
(45) Date of Patent: Dec. 1, 2015

(54) SYSTEM AND METHOD TO ENHANCE AND PROCESS A DIGITAL IMAGE

(71) Applicant: Marseille Networks, Inc., Santa Clara, CA (US)

(72) Inventors: Junlan Yang, Santa Clara, CA (US); Eberhard H. Fisch, San Jose, CA (US)

(73) Assignee: Marseille Networks, Inc., San Jose, CA (US)

( * ) Notice: Subject to any disclaimer, the term of this patent is extended or adjusted under 35 U.S.C. 154(b) by 30 days.

(21) Appl. No.: 14/214,363

(22) Filed: Mar. 14, 2014

Related U.S. Application Data

(60) Provisional application No. 61/786,264, filed on Mar. 14, 2013.

(51) Int. Cl.
    *G06K 9/40* (2006.01)
    *G06T 5/00* (2006.01)
    *G06T 5/20* (2006.01)
    *H04N 5/21* (2006.01)
    *H04N 5/14* (2006.01)

(52) U.S. Cl.
    CPC . *G06T 5/005* (2013.01); *G06T 5/20* (2013.01); *H04N 5/142* (2013.01); *H04N 5/21* (2013.01); *G06T 2207/10016* (2013.01); *G06T 2207/20192* (2013.01)

(58) Field of Classification Search
    CPC ......... G06T 5/001; G06T 5/004; G06T 5/005; G06T 5/20; G06T 5/40; G06T 5/50; G06T 2207/20016; H04N 1/4092; H04N 5/21; H04N 5/142
    See application file for complete search history.

(56) References Cited

U.S. PATENT DOCUMENTS

| | | | | |
|---|---|---|---|---|
| 5,442,462 A | * | 8/1995 | Guissin | 358/463 |
| 6,937,776 B2 | * | 8/2005 | Li et al. | 382/260 |
| 6,983,076 B2 | * | 1/2006 | Curry et al. | 382/260 |
| 7,379,626 B2 | * | 5/2008 | Lachine et al. | 382/300 |
| 7,529,422 B2 | * | 5/2009 | Wang et al. | 382/254 |
| 7,738,725 B2 | * | 6/2010 | Raskar et al. | 382/266 |
| 7,817,872 B2 | * | 10/2010 | Michel et al. | 382/266 |
| 8,280,183 B2 | * | 10/2012 | Kempf et al. | 382/274 |
| 8,872,946 B2 | * | 10/2014 | Cote et al. | 348/241 |

* cited by examiner

*Primary Examiner* — Amir Alavi

(57) ABSTRACT

A Digital Video Processing System is provided to process an input digital image, where the video data information of the input digital image includes an undesired noise and a comfort noise. The Digital Video Processing System extracts the input noise which corresponds to both the undesired noise and the comfort noise out of the input image, processes a remaining image, scaling the remaining image to a desired output resolution, extracts the comfort noise from the input noise, processes the comfort noise to regenerate the comfort noise at the desired output resolution, adds the processed comfort noise to the processed remaining image to produce the output digital image at the desired resolution, displays the processed output digital image using an electronic display device, or a region of an electronic display device at the desired output resolution.

1 Claim, 3 Drawing Sheets

SYSTEM AND METHOD TO ENHANCE AND PROCESS A DIGITAL IMAGE

PRIORITY CLAIM

This patent application claims the benefit under 35 U.S.C. 119(e) of Provisional Patent Application No. 61/786,264 filed on Mar. 14, 2013, which is incorporated herein by reference in its entirety.

TECHNICAL FIELD

The subject of this application generally relates to the field of digital image processing and more particularly to the processing of a digital image using a plurality of processing systems to enhance an overall viewing quality of the digital image.

BACKGROUND

In general, various types of enhancement for digital images of certain application such as medical scan, MRI imaging have been studied and analyzed. Given the monotonic nature of such digital images, certain techniques are useful in enhancing the contrast or sharpness to provide an enhanced viewing experience of these types of images. There is a need for a video and image processing and enhancement system particularly suited for contextual enhancement of video and digital images taking into account various characteristics and features of the image, a region of the image, and/or a group of pixels within the image. In addition, the effect of one type of enhancement may detrimentally affect the results of another desired enhancement, thus an intelligent system needs to distinguish between the various types of enhancement being performed such that processing artifacts of the output enhanced image are greatly reduced.

A typical digital image is not monotonic in nature and thus one would expect the typical digital image to include a variety of regions within it containing different levels of details. Some regions may include very high amount of fine details (texture), other regions may include edges or contours (jaggy), yet other regions may include low or hardly any details at all (flat region).

Video enhancement techniques are designed to enhance the visual quality of videos and images, which is an indispensible component for most of the video processing systems and products. Video enhancements could include a wide range of features such as detail enhancement, focus enhancement, motion blur removal, contrast enhancement, color adjustment, noise reduction, flicker reduction, and frame rate conversion.

SUMMARY

A region of a digital image with a high level of details would include a neighborhood of pixels where the video data information of each pixel is expected to have a high variance with respect to the other pixels, which corresponds to having a high level of texture content such as a colorful butterfly.

In contrast, a region of a digital image with a low level of details would be considered a flat region and would include a neighborhood of pixels where the video data information of each pixel is expected to have a low variance with respect to the other pixels of this flat region, which is indicative of low level details such as blue sky.

Furthermore, a region of a digital image that contains edges or contours may be referred to as a Jaggy region and thus would include multiple neighborhoods of pixels. For example, the video data information of some of the pixel at the boundary of the edge or the contour are expected to have a high variance with respect to the other pixels of this edge boundary neighborhood, such as edges of a text within the digital image. In contrast, the video data information of each of the pixels comprising the edge itself is expected to have a low variance with respect to the other pixels forming the edge itself. Similarly, the video data information of each of the pixels located within the neighborhood of the edge, e.g. few pixels away from the edge, is expected to have a low variance with respect to the other pixels forming the neighborhood of the edge.

Moreover, a portion of a digital image may be classified using additional criteria based on a given relationship between the video data information content of each of the pixels within a neighborhood of pixels of a region within the portion of a digital image. Additionally, each region within a portion of a digital image may include one or more types of details. In other words, a region may include multiple local regions (or neighborhood of pixels) each of which contains different level of details.

It becomes apparent that a certain type of enhancement technique for digital images of certain application such as medical scans or finger print will not be suited to enhance the viewing experience of typical digital images containing many different types of image details. For example, applying a noise reduction filtering technique or sharpening algorithm to a MRI scan may produce an enhanced image. However, applying the same technique to a typical image may actually reduce noise or sharpen the image in certain regions while having a devastating effect on other regions of the image which may cause blurring or other artifact and that means an unsuccessful enhancement. Certainly it would decrease the overall viewing quality of digital images or a moving picture. The following provides detailed description of a system and method to enhance the viewing quality of digital images while taking into consideration multiple and distinct parameters affecting the processing and desired enhancement of global and local regions within a digital image.

The technique described here, referred as contextual video enhancement (CVE), targets at three features: detail enhancement, edge enhancement and noise reduction. Detail enhancement, known also as sharpening, refers to the process of enhancing the sharpness in the image so the details are more visible and contrasts are higher. Edge enhancement mainly concentrates on jaggy removal, where the term "jaggy" or "jaggies" are referring to the jagged appearance usually seen on straight edges in digital images. Edge enhancement not only removes the jaggies but also removes noise around the edges thus improves the consistency and appearance of the edges. Noise reduction is used to remove random noise, film grain noise as well as mosquito noise and block noise generated with video compression process. These three enhancements are simultaneously applied to the image and video to create higher visual quality.

Various attempts have been made to provide certain enhancement for video; However, processing artifacts is a major problem that exist in the processed video. Noise reduction can easily cause loss of details in textured regions and blur around edges. Edge enhancement is very likely to introduce smeared texture in texture regions. Moreover, detail enhancement applied to noisy images will increase the noise level in the same time while increasing sharpness. These artifacts are common with existing techniques and quite annoying for normal viewers. It defeats the purpose of video enhancement, and could cause the viewers to turn off the enhancement processing completely.

The fundamental reason for above described artifacts is due to the fact that the existing processing techniques are not adaptive to images, either in terms of local features or global features. In other words, both the types of processing and the strengths of processing should be different for different regions of the images as well as for different types of images. For instance, we should only apply a light noise reduction around edges and even smaller for micro-textured regions; so that edges and textures are preserved better. On contrast, we should apply a strong noise reduction to flat regions as noise are most visible here; and at the same time no edges nor textures would be destroyed.

The proposed contextual video enhancement (CVE) technique is described to meet these needs to produce a high quality high definition digital images. CVE is designed to adapt to both local image context (within a single image or video frame) and global image characteristics—taking into account features or characteristics of the whole image or video frame. CVE is adaptive in pixel level, meaning every pixel could be treated differently and the proper treatment is automatically determined by algorithms. In this way, we can avoid artifacts and make sure the visual improvements can be observed not only for overall images but also for local regions.

The processing steps used to determine the proper enhancement would analyze the local image context to identify the pixel type, i.e., a classification process. According to our feature list, three types of pixels are defined: edges, textures and flat regions. But note that this classification process is not binary, i.e., it does not determine one pixel belong to edge and not the other two. Instead, it gives three probabilities of this pixel belonging to each one of the types. Probabilities are numbers between zero and one, which are later used as weights to combine the output of each processing. Comparing to binary decisions, it is more robust to errors especially in ambiguous regions. For example, it is difficult to tell microtexture from noise. Perform noise reduction on microtexture would result in removing that detail. Using probability, one would be able to obtain a result that is in-between of removing and enhancing the detail.

In general, the features and techniques discussed herein can be applied across many desired video processing effects. The classification process is performed on the input image to produce one or more modified image with a particular desired processing effect, and then the processing of each of the one or more modified image is performed in parallel and to a large extent independently from the processing of other modified images. The processed output of each modified image are processed in an output stage in accordance with system defined parameters and user defined parameters so that a final video image is produced that correspond to an enhanced version of original video image. In this disclosure, we discuss three classification processing steps geared towards edge enhancement of at least one portion of the input image containing an edge, enhancement of the sharpness of the input image, and enhancement of the input image by removing noise but not the details of the input image. Due to the non-binary classification, all the pixels of the input image would go through classification process, enhancement process, and blending process. The blending or merging process is the final step that combines the output of each processing stage, which enhances a particular modified input image for a particular desired enhancement effects, using enhancement parameters that were obtained, inferred, or calculated during the classification process and/or the enhancement processes. The merging process is an intelligent process that blends the individually enhanced modified images in accordance with certain probabilities using one or more of the enhancement parameters as will be described in this disclosure.

This disclosure presents new and useful methods and systems to provide multilevel context sensitive video enhancement and processing. In accordance with one embodiment, this multilevel context sensitive digital image enhancement is presented to provide an enhanced viewing experience of the digital image—video data information—being observed by a user. Furthermore, providing the user the ability to manipulate the desired enhancement of the original digital image while viewing an updated enhanced version of the digital image, this can be done on a side by side or outputting the original digital image and enhanced digital image using separate video display, using separate portions of a video display monitor, or on top of each other. The enhanced digital image viewed is generated based at least on system and/or user defined or generated parameters in accordance with the content of the original digital image, a modified version of the original digital image, and a processed version of the modified version of the digital image. The processing steps of the original digital image includes at least one stage to modify the original digital image information in accordance with a first desired enhancement effect, and processing the modified digital image information to produce a first enhanced version of the original image. Additional stages may be added, for example, to modify the original digital image information in accordance with a second desired enhancement effect, and processing the second modified digital image information to produce a second enhanced version of the original image. As many stages may be added to enable the processing and enhancement of any desired enhancement effect. Lastly, a final processing step to intelligently blend the first and second—all of the—enhanced versions of the original image in accordance with system parameters and parameters reflecting the content of each of the enhanced versions of the original image. For example, the final output image may include a blend using a first weight for a first portion of the first enhanced version of the original image and a second weight for a first portion of the second enhanced version of the original image, wherein the first portion of the first enhanced version of the original image and the first portion of the second enhanced version of the original image correspond to a first group of pixels location within the original image. Similarly, the same final output image may include a blend using a third weight for a second portion of the first enhanced version of the original image and a fourth weight for a second portion of the second enhanced version of the original image, wherein the second portion of the first enhanced version of the original image and the second portion of the second enhanced version of the original image correspond to a second group of pixels location within the original image. An intelligent process is used to determine the weight with which each pixel, or a group of pixels, is blended from each enhanced version of the original image to produce the final output image.

In the same way, additional stages to enhance the original image for a certain desired effect can be added to process the original image and to produce an additional enhanced version of the original image and the final blending stage maybe programmed to blend the video data information of the pixels of the added enhanced version of the original image using blending parameters extracted from the processing steps of the added enhanced version of the original image. These blending parameters are used to determine the weight with which each pixel, or a group of pixels, is blended from each enhanced version of the original image to produce the final output image. Moreover, these blending parameters include dynamically changing parameters, fixed parameters, and user parameters. Various parameters can be programmed or generated based on pixel video data information content, pixel location, a region, locality, or neighborhood of pixels within the original image. Finally, the user maybe provided with ability to manipulate these parameters or the desired enhancement effect of the original image to produce a targeted and better enhancement for a particular digital image or a stream of images such as in video games, movies, or animation.

In certain aspects, multiple processing systems are used to process a digital image and for each pixel of a region or portion of the digital image. The outputs of each processing system are combined in accordance with at least one probability function to produce at least one pixel, so as to enhance an overall viewing quality of the digital image.

DETAILED DESCRIPTION

The present disclosure presents techniques, systems and methods to provide contextual processing and enhancements of videos and images by tailoring different processing and enhancement algorithms to different parts of the images and videos taking into account they local and global characteristics.

The term "coupled" is defined as connected, although not necessarily directly, and not necessarily mechanically. The terms "a" and "an" are defined as one or more unless this disclosure explicitly requires otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

Figure 1:
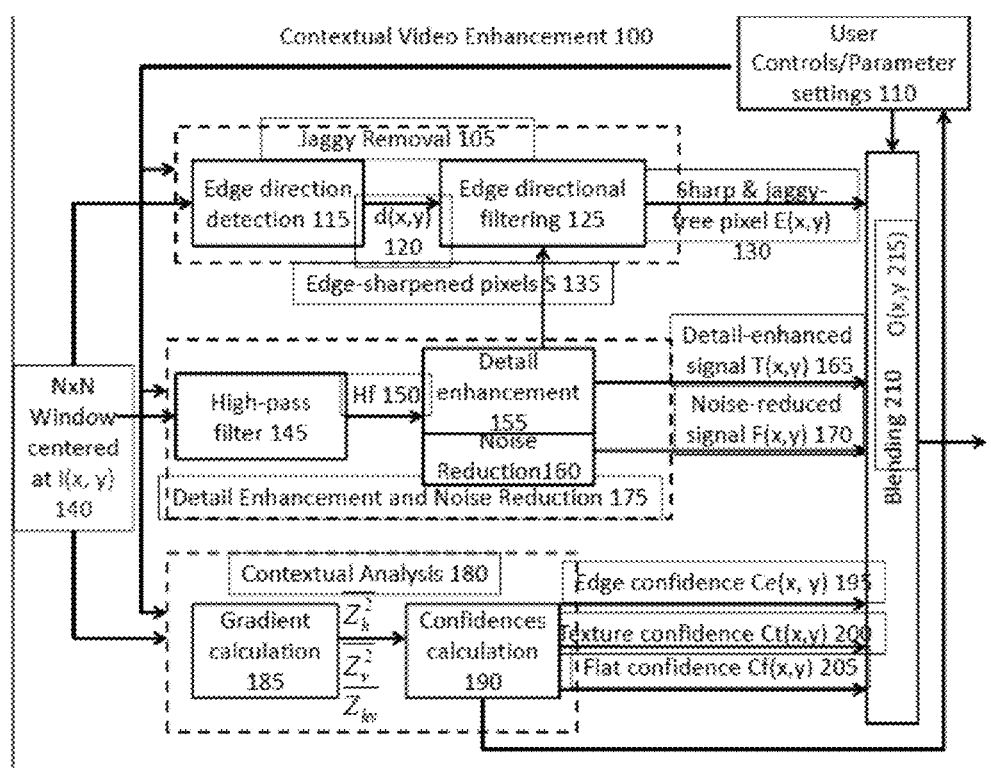
FIG. 1 shows a block diagram of an example of contextual digital image enhancement system.

System Overview is shown in FIG. 1 shows a diagram. Note in FIG. 1, the input is only the Y component of the image. The reason is the U and V component of the image usually have low resolution, meaning they do not have sharp edges nor much details. Jaggies are normally not presented in UV, and sharpening would cause many color-shifting artifacts. That's why we restrict the processing in Y component. Moreover, the input is presented as a window of data. It shows that to output one single pixel O(x,y), x,y stand for pixel location (row and column), we not only need the input pixel I(x,y), but also two-dimensional neighbors around it. All the processing blocks are window-based, except the final blending stage where all the input are scalars.

The "User Controls/Parameter Settings" block defines all the parameters that can be modified by external sources, either they are users or other automatic programs. We provide details on each processing block in the following sessions.

Contextual analysis is the key component for this system. It determines the probabilities that a pixel belongs to either an edge, a texture region, or a flat region. These probabilities can be used later as weights to blend processed pixels.

The definition of the different pixel types is based on content variation. An edge is defined as a local region that has one and only one consistent direction of variation. A texture region is defined as a region that has multiple directions of variation. A flat region is a local region that has little to none variations.

The contextual analysis is based on the gradients of the image. Gradients are important image features that contain information about how the image content varies in a local region. They are used for detecting edges and corners as well as enhancing them. But one property in particular can be used as an indication of local variation consistency. It can be used to tell how consistent the variation is, as well as the strength of the variation. Consider our definition on edge, texture and flat region, one can see that this property makes the gradient an ideal image feature to our purpose.

To utilized the gradients in processing the images, a Gradient Covariance Calculation task is carried out. First, we start by calculating the horizontal gradients and vertical gradients of the image. This is accomplished by convolving the image with a horizontal gradient operators and a vertical gradient operator. There are several commonly used gradient operators that can be used such as Sobel operator, Prewitt operator and Roberts operator. These operators are either 3-by-3 or 2-by-2, which are cheap to implement but do not perform well with noise presence. One can design larger operators by convolving these basic operators with a Gaussian kernel. The larger the standard deviation of the Gaussian kernel, the better noise suppression the gradient operator gets, and the less localization the resulting gradient image becomes. Therefore, a balance can be achieved by carefully selecting the standard deviation for different type of context or scenarios.

Figure 2:
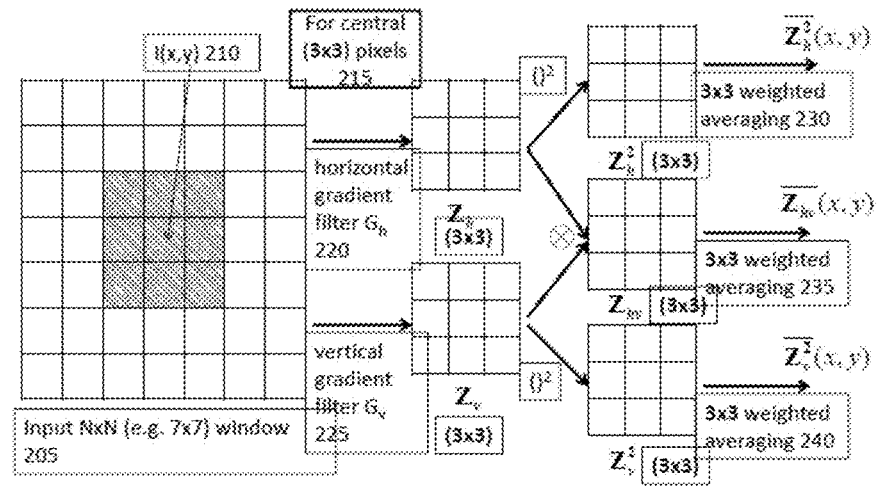
FIG. 2 shows a block diagram of an example of a modified group of pixels for enhancement.

Once we decided on the horizontal and vertical gradient operator $G_h$ and $G_v=G_h^T$, one can convolve the image with the operators to get the horizontal and vertical gradients, i.e., the horizontal gradient $Z_h$ and vertical gradient $Z_v$ are calculated as: $Z_h=I*G_h, Z_v=I*G_v$, where "*" stands for convolution. We further obtain the square-gradients and cross-gradient as follows: $Z_h^2=(Z_h)^2, Z_v^2=(Z_v)^2, Z_{hv}=Z_hZ_v$. These multiplications are element-wise operations, i.e., dot-products. This is illustrated in FIG. 2.

The gradient covariance matrix is defined as a 2-by-2 matrix where its main diagonal consists of the two square-gradients and the counter-diagonal consists of the cross-gradient. In order for the tensor to be more robust, one can also convolve the square-gradients and cross-gradients with a small Gaussian kernel. In this case, the Gaussian kernel is recommended to have small standard deviation, such as 0.5 or 0.7 to avoid too much smoothing. We call the smoothed square-gradients $\overline{Z_h^2}, \overline{Z_v^2}$ and the smoothed cross gradients $\overline{Z_{hv}}$. Then the gradient covariance matrix is given as $$Q \triangleq \begin{bmatrix} \overline{Z_h^2} & \overline{Z_{hv}} \\ \overline{Z_{hv}} & \overline{Z_v^2} \end{bmatrix}.$$

This is sometimes also referred as gradient structure tensor [5].

The gradient covariance matrix contains information on local image structure. First of all, the norm of the gradient vector is the summation of the diagonal components of the covariance matrix, i.e., norm=$\overline{Z_h^2}+\overline{Z_v^2}$. It is a good indicator for whether a local region has variation. The larger the norm, the stronger the variation is. In other words, the smaller the norm, the larger the probability that this region is a flat region. Therefore, we can form a flat region confidence measure $C_f$ using the following:

$$C_f \frac{\sigma_n^2}{\text{norm}+\sigma_n^2} = \frac{\sigma_n^2}{\overline{Z_h^2}+\overline{Z_v^2}+\sigma_n^2}, \text{ or}$$

$$C_f = \exp\left\{-\frac{\text{norm}}{2\sigma_n^2}\right\} = \exp\left\{-\frac{\overline{Z_h^2}+\overline{Z_v^2}}{2\sigma_n^2}\right\}.$$

Both equations of $C_f$ go to 1 when norm=0 and goes to 0 when norm→∞. Here the $\sigma_n^2$ is a constant to control how sensitive this flat confidence is to image noise. This constant can either be estimated from the images or be set by user. Increasing this constant can increase the flat confidences thus more noise reduction can be performed and vice versa.

We can further separate edge and texture by looking at the relationship between the two eigenvalues of the covariance matrix. Denote the first eigenvalue to be $\lambda_1$ and the second eigenvalue to be $\lambda_2$, $\lambda_1 \geq \lambda_2$. If the first eigenvalue is dominant, i.e., $\lambda_1 \gg \lambda_2$, it is highly probable that this local window has a dominant orientation. On the contrary, if the two eigenvalues are similar, i.e., $\lambda_1 \approx \lambda_2$ it means there is no dominant orientation. Therefore, we form the following homogeneity measure:

$$P = \frac{2\sqrt{\lambda_1 \lambda_2}}{\lambda_1 + \lambda_2}.$$

It reaches 1 when $\lambda_1 = \lambda_2$, meaning there are no dominant orientation at all; and reaches 0 when $\lambda_2 = 0$, meaning the orientation is completely dominant. Other choices of P includes [4][5]:

$$P = \frac{4\lambda_1 \lambda_2}{(\lambda_1 + \lambda_2)^2} \text{ or } P = 1 - \frac{\lambda_1 - \lambda_2}{\lambda_1 + \lambda_2}.$$

Note that $\lambda_1 + \lambda_2 = \text{norm} = \overline{Z_h^2} + \overline{Z_v^2}$, and $\lambda_1 \lambda_2 =$ determinant of $Q = \overline{Z_h^2} \cdot \overline{Z_v^2} - (\overline{Z_{hv}})^2$. Also a small constant can be added to the norminator to avoid division by zero. Take the first form of homogeneity measure as an example, we define the edge and texture confidence measures as $$C_e \frac{\lambda_1 + \lambda_2 - 2\sqrt{\lambda_1 \lambda_2}}{\lambda_1 + \lambda_2 + \epsilon} = \frac{\overline{Z_h^2} + \overline{Z_v^2} - 2\sqrt{\overline{Z_h^2} \cdot \overline{Z_v^2} - (\overline{Z_{hv}})^2}}{\overline{Z_h^2} + \overline{Z_v^2} + \epsilon},$$

$$C_t = \frac{2\sqrt{\lambda_1 \lambda_2}}{\lambda_1 + \lambda_2 + \epsilon} = \frac{2\sqrt{\overline{Z_h^2} \cdot \overline{Z_v^2} - (\overline{Z_{hv}})^2}}{\overline{Z_h^2} + \overline{Z_v^2} + \epsilon}.$$

These confidence measures are normalized confidence measures, meaning the strength of the edge and texture are not affecting the value. There are cases when it is preferable to process strong edges differently than weak edges. We can add an indicator of edge strength using the already calculated norm: $C_e' = C_e \cdot \text{norm}/\max(\text{norm})$. Sometimes thresholding are needed when we combine the confidence measure with the strength indicator. There are cases when the edge is very coherent and jagged, but the color is close to the background so the norm is very small. In such cases, we want to set a threshold Th, 0<Th<1. Only when $C_e$ is smaller than Th, it gets multiplied by the strength indicator. This enables the system to identify coherent edges regardless of their edge strength.

One can easily notice that when we choose the first form of $C_f$ and set $\sigma_n^2 = \epsilon$, the three quantities automatically adds up to 1. In cases where they do not add up to 1, one can choose to modify the lowest value among those three and force it to be one minus the other two. Since they are used as weights later for blending, it is important for them to add up to one to avoid DC shift in processed image.

The detail enhancement and noise reduction are features with opposite goals but can be achieved using similar techniques. They both deal with high frequency in the image. High frequencies in textured regions are commonly perceived as details while in flat regions appear as random noise. Although there are cases where random noise also exists in textured regions, it is difficult to separate them out from the micro-textures. At the same time, noise in textured regions is masked by micro-textures thus not very visible. Therefore in this algorithm we confine ourselves to noise in flat regions.

Detail enhancement is the process of increasing the high frequency and noise reduction is the process of decreasing it. It is obvious that high frequency signals need to be separated from the images first to do both. This is accomplished by using a high-pass filter.

The high pass filter used here is a two-dimensional 3-by-3 filter K(i,j), i=−1,0,1, j=−1,0,1. One choice of K has the following coefficients:

$$K = \frac{1}{16}\begin{bmatrix} -1 & -2 & -1 \\ -2 & 12 & -2 \\ -1 & -2 & -1 \end{bmatrix}.$$

This filter is derived by subtracting a 2D low-pass filter from a delta function where the low-pass filter is a outer product of [1 2 1] and [1 2 1]$^T$ (T stands for transpose). Other choices of high-pass filter includes the Laplacian filter [1]:

$$K = \frac{1}{8}\begin{bmatrix} 0 & -1 & 0 \\ -1 & 4 & -1 \\ 0 & -1 & 0 \end{bmatrix} \text{ or } K = \frac{1}{16}\begin{bmatrix} -1 & -1 & -1 \\ -1 & 8 & -1 \\ -1 & -1 & -1 \end{bmatrix}.$$

One can also choose larger filters (such as 5-by-5 Laplacian filters) to be more resistant to noise. The high frequency is separated by convolving the image with the filter, i.e., $$hf(x, y) = \sum_{j=-1}^{1} \sum_{i=-1}^{1} I(x+i, y+j) K(i, j).$$

Detail enhancement is achieved by multiplying the high frequency signal by a positive constant and then adding back to the original image. Note that the constant controls the level of enhancement. Larger the constant, sharper the image appears. We thus call this constant "sharpening level" and denote it as $\alpha$. Note the edges and textures can have different $\alpha$'s. We denote the $\alpha$ for edge as $\alpha_e$ and the $\alpha$ for texture as $\alpha_t$:

$$S(x,y) = I(x,y) + \alpha_e \cdot hf(x,y),$$

$$T(x,y) = I(x,y) + \alpha_t \cdot hf(x,y).$$

Figure 3:
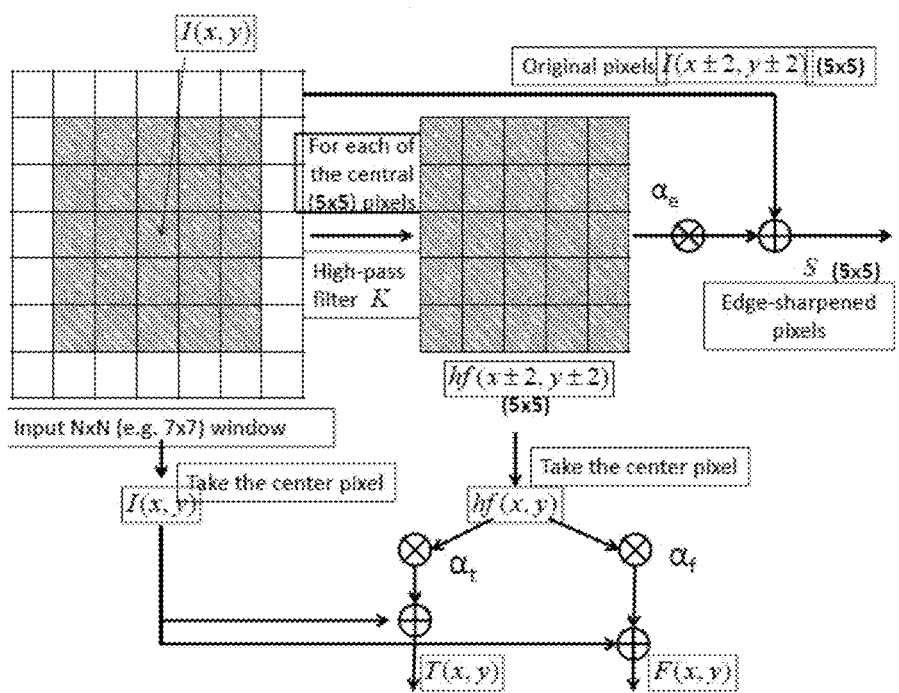
FIG. 3 shows a block diagram of an example of a modified group of pixels for sharpness enhancement.

This is illustrated in FIG. 3. Notice for signal S, since it may be used in later jaggy removal block which requires a window of data instead of one single pixel, we need to repeat the process for several pixels around I(x,y). The number of pixels needed is determined by the filter size in the jaggy removal block. We are showing a 5-by-5 window as an example. But for signal T, one single pixel output is sufficient. But one can choose to repeat the process for other pixels when needed.

This process is also known as Unsharp Masking (USM) [1][6]. There are several variations of implementing it, including using thresholding on the high frequency to avoid enhancing noise [2], as well as adapting the sharpening level a according to image statistics to avoid too much over/undershoots [3].

For noise reduction, the same procedure works except that the constant is negative. We denote this constant as $\alpha_f$ and it is a negative value between −1 and 0. The result is the original image minus the high frequency noise, which would be perceived as noise reduced image, especially in flat region:

$$F(x,y) = I(x,y) + \alpha_f \cdot hf(x,y).$$

Figure 4:
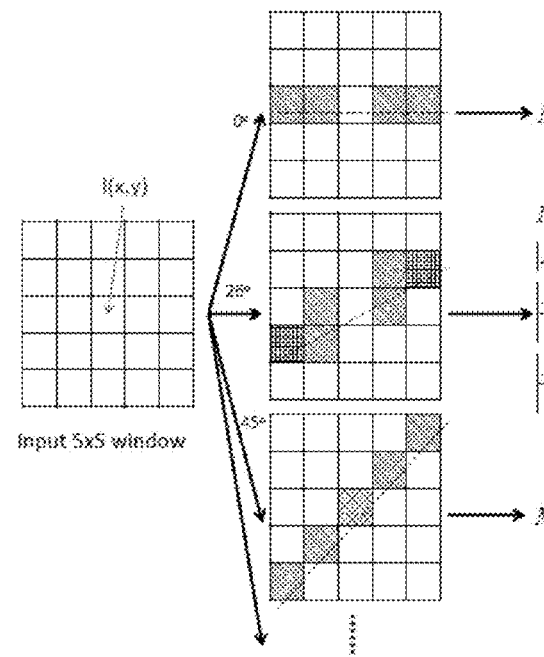
FIG. 4 shows a block diagram of an example of a modified group of pixels for edge enhancement

"Jaggy" or "Jaggies" is a phenomenon where straight edges appear as stairlike lines. It is a common artifact for digital images where pixel resolution is not large enough to portrait smooth lines or curves. It is sometimes also referred to as "aliasing" (example shown in FIG. 4).

Traditional solution is to apply an "anti-aliasing" filter where the edge pixels are blended with their neighboring pixels to reduce the inconsistency. The disadvantage is the edges usually appear too smooth after this filter. The fundamental reason is that the filtering process is not adaptive to edge directions. With a non-directional filter, all the pixels around the edges can be used for blending, even pixels crossing the edges. To avoid such unnecessary smoothing, a directional filtering scheme is used to only smooth along the edges instead of crossing them.

In order to achieve that, jaggy removal feature consists of two blocks. One is to detect the direction of the edge and the other is to apply a proper filter for that specific direction. The first part is especially critical in obtaining satisfactory results.

To detect the direction of the edge, we take a window of data around current pixel and put them through a series of SAD (sum of absolute difference) type of test. The reason behind is because pixels along the edge direction will have similar intensity values. So if we take those pixels and compare them one by one to the center pixels, the difference should be minimal. It is implemented in a hypothesis-testing procedure. We assume there is $N_d$ possible angles how the edge crosses the center. For each angle, we calculate a summation of absolute difference between pixels selected by that angle and the center pixel. This is a score for that possible angle, denoted as $M_d(x,y)$, $d=1, \ldots, N_d$. The winning angle is the one that has the lowest score, i.e., $d(x,y)=\mathrm{argmin}_d M_d(x,y)$.

Figure 5:
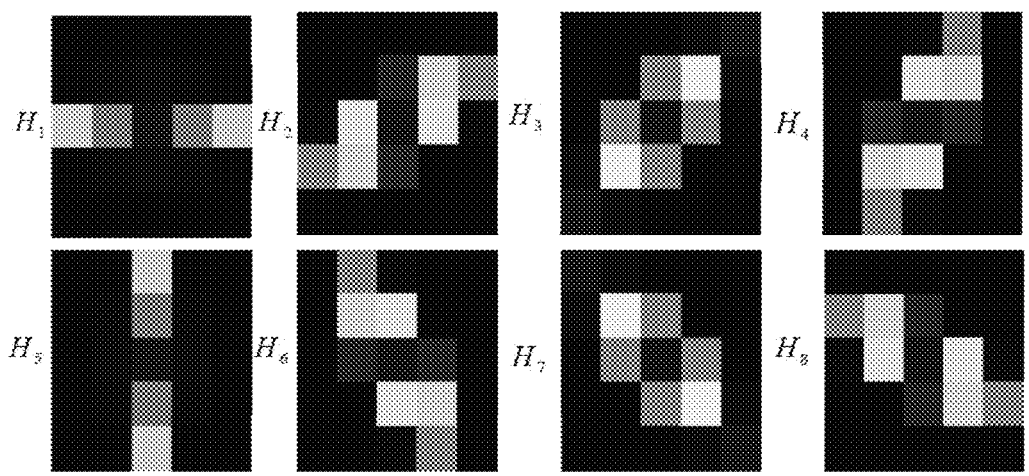
FIG. 5 shows a block diagram of an example of a modified group of pixels for edge enhancement.

The set of possible angles can be selected empirically or adaptively for specific circumstances. Usually 0°, 45°, 90°, 135° are included. Other angles in-between of those can be added. The pixels selected by each of 0°, 45°, 90°, 135° are full-pixels; while the pixels selected by other in-between angles are half-pixels. Interpolation needs to be implemented to calculate the value of the half-pixels. We show an example of the SAD calculation with 0°, 26°=a tan(2) and 45° in FIG. 5.

The above SAD-based approach works for detecting an angle within a limited set of angles. Since only summation and taking absolute value are involved, implementation is cost-effective. However its cost increases when the total number of angles increases. And it may not cover all the angles, such as angles that are close to horizontal and vertical direction. Here we describe an alternative scheme to calculate angles from the image gradients.

As mentioned in earlier, the image horizontal and vertical gradients $Z_h$, $Z_v$ contains information on how the image varies in a local region. It can directly be used to calculate the direction of changes. The angle of the edge $\theta_{EG}$ is given by $\theta_{EG} = \tan^{-1}(Z_h/Z_v)$. However, this approach is not resistant to noise, therefore the angles are not always accurate. A better approach is to use the eigenvector of the covariance matrix to identify the directional vector [4][5]. The eigenvector that corresponds to the largest eigenvalue $\lambda_1$ is going to be orthogonal to the edge direction. This eigenvector is given by $[-\overline{Z_{hv}}, \overline{Z_h^2} - \lambda_1]^T$. This vector can be used to obtain an edge angle that is more robust. It can also be used directly to calculate the edge-directional filtering kernel without obtaining a specific value of the angle.

After determining the angle, the filtering process is straight-forward. For each angle, we design a 2D filter that has high weights along the angle and low weights across the angle. We then take the already sharpened image and convolve it with the filter. We show here the formula when the filter H(i,j) has a size of 5-by-5:

$$E(x, y) = \sum_{j=-2}^{2} \sum_{i=-2}^{2} S(x+i, y+j) H_{d(x,y)}(i, j).$$

Note the filter H is changing according to the edge direction d(x,y).

We found the two-dimensional elliptical Gaussian filter a good candidate for this filtering. By changing the standard-deviation for the Gaussian filter, one can change the strength of the filtering. By changing the cross-correlation term, one can change the rotation of the filter to accommodate different angles. Here we show an example of a possible set of edge directional filters in FIG. 6. In the case where we defined a limited set of edge directions, we can simplify the implementation by storing some pre-defined set of filters for these angles. In cases where the angles are arbitrary, or one prefers to change the filtering strength on the fly, a filter calculation process needs to be implemented.

Blending: After the above three processing blocks (Con-texture analysis, Detail enhancement and noise reduction, Jaggy removal), we obtain the following signals:

Detail enhanced signal T(x,y) and the texture confidence measure $C_t(x,y)$;

Jaggy removed signal E(x,y) and the edge confidence measure $C_e(x,y)$;

Noise reduced signal F(x,y) and the flat confidence measure $C_f(x,y)$.

The blending process is just a linear weighted summation of these signals:

$$O(x,y)=C_t(x,y)\cdot T(x,y)+C_e(x,y)\cdot E(x,y)+C_f(x,y)\cdot F(x,y).$$

To add one additional layer of flexibility, one can also use a parameter to bypass the jaggy removal:

$$O(x,y)=[C_e(x,y)\cdot(1-\beta)+C_t(x,y)]\cdot T(x,y)+C_e(x,y)\cdot\beta\cdot E(x,y)+C_f(x,y)\cdot F(x,y).$$

One can see that when $\beta=1$, meaning jaggy removal is ON, the second equation reduces to the first one. When $\beta=0$, meaning jaggy removal is OFF, the second equation becomes $O(x,y)=[C_e(x,y)+C_t(x,y)]\cdot T(x,y)+C_f(x,y)\cdot F(x,y)$, effectively setting E(x,y) to be equal to T(x,y). This parameter can be used when no jaggies are present or when jaggy processing can cause severe artifacts.

Parameter Setting: There are several parameters that need to be set for the output image to obtain optimal quality. Parameters such as $\alpha_e$ and $\alpha_t$ controls the sharpness level of the processed image. Parameter $\alpha_t$ and $\sigma_n^2$ controls the strength of noise reduction. $\beta$ or possible threshold Th can be used to control the strength of jaggy removal. These values can be set by an experienced user, or more preferably, be set adaptively based on the type of images to be processed.

One way to adapt the parameters to different images is to identify what type of content is dominant in the image. For example, for an image that contains a lot of texture, we shall emphasize on the detail enhancement part, meaning setting sharpness level to high values. At the same time, we shall de-emphasize the jaggy removal part and noise removal part to eliminate any removal of texture. This way we can ensure the processing is benefiting most of the image and minimizing any possible damages.

A good indicator of the type of content that dominates is to look at again the confidence measures, but this time in a global level. Confidence measures across the whole image or a large region of the image is a solid indicator of which type of pixels are more dominant than others. One can either accumulate the confidence measures or to count the pixel numbers of each type after thresholding the confidence measures. For example, we can define $C_1$ and $C_2$ as follows:

$$C_1=\Sigma_{\{(x,y):norm(x,y)>\epsilon\}}C_e \text{ and } C_2=\Sigma_{\{(x,y):norm(x,y)>\epsilon\}}C_t.$$

The conditions in the summation are due to the fact that in flat region, the confidence measures for edge and texture are unreliable. Compare $C_1$ and $C_2$ one can determine whether the image are mostly straight edges or mostly textures, and set the parameters accordingly.

The invention claimed is:

1. A system for contextual digital image enhancement, the system comprising:
    a first circuit configured to receive a portion of a first image, the portion of the first image including a first number of pixels corresponding to a first N×N window centered around a first pixel, wherein the circuit is configured to process the first number of pixels to extract at least an edge confidence value, a texture confidence value, and a flat confidence value;
    a second circuit configured to receive at least a portion of the first number of pixels and the edge confidence value, wherein the second circuit is further configured to produce an edge enhanced pixel using the at least a portion of the first number of pixels and the edge confidence value;
    a third circuit configured to receive at least a portion of the first number of pixels, the texture confidence value, and the flat confidence value, wherein the third circuit is further configured to produce a detail-enhanced pixel using the at least a portion of the first number of pixels, and the texture confidence value and the flat confidence value; and
    a fourth circuit configured to receive a user controlled parameter value, the edge enhanced pixel, the detail-enhanced pixel, the edge confidence value, the texture confidence value, and the flat confidence value, wherein the fourth circuit is further configure to produce an output pixel using the edge enhanced pixel, the detail-enhanced pixel, the edge confidence value, the texture confidence value, and the flat confidence value.

* * * * *